R. W. DAVIS.
CHURN.
No. 10,566.
Patented Feb. 28, 1854.
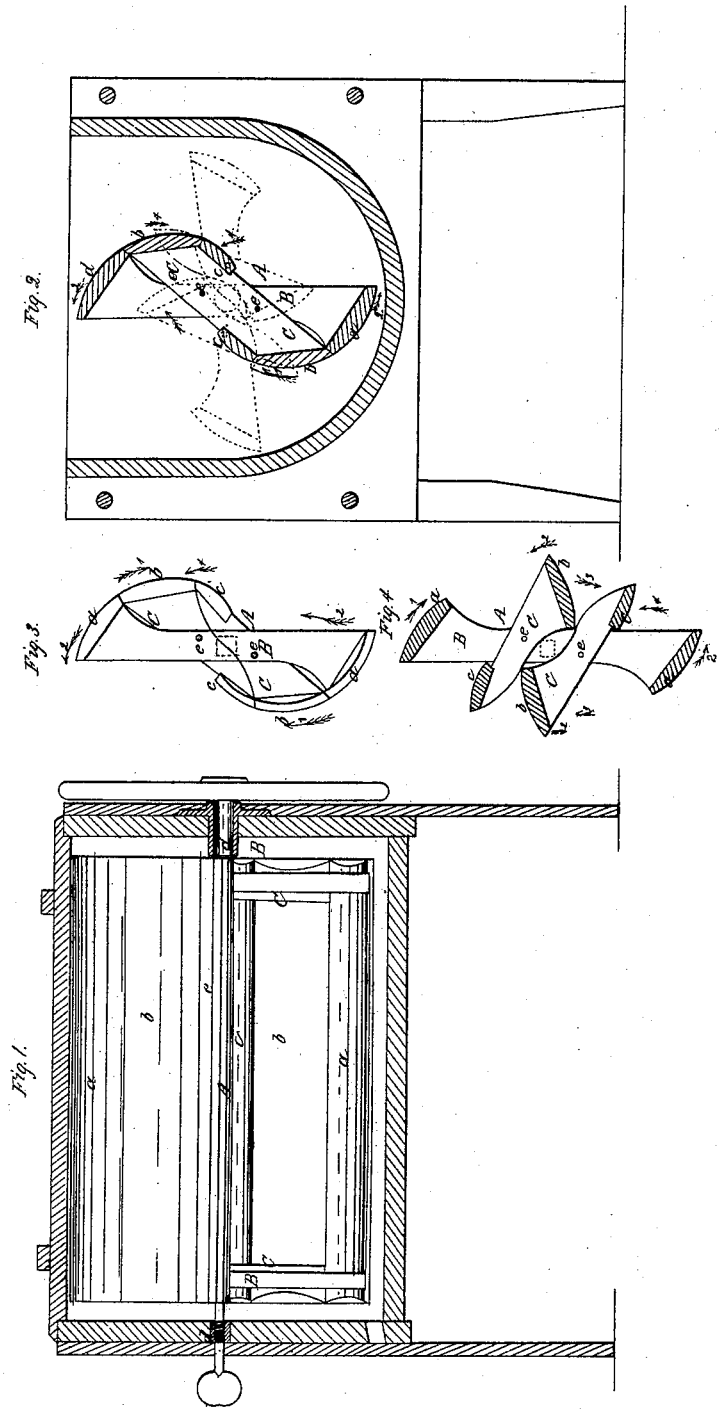

UNITED STATES PATENT OFFICE.

ROBERT W. DAVIS, OF RODGERSVILLE, NEW YORK.

CHURN.

Specification of Letters Patent No. 10,566, dated February 28, 1854.

*To all whom it may concern:*

Be it known that I, ROBERT W. DAVIS, of Rodgersville, in the county of Steuben and State of New York, have invented certain new and useful Improvements in Churns for Making and Working Butter; and I do hereby declare that the following is a full, clear, and exact description of the same, reference being had to the accompanying drawings, forming part of this specification, in which—

Figure 1, represents a vertical longitudinal section of the churn through the center, the dasher being shown in elevation, and as prepared or adjusted for working the butter in the churn. Fig. 2, is a vertical transverse section of the same, the dasher being shown in black lines as adjusted for working the butter after it has been produced, and in red lines as adjusted for working the cream before the butter is produced. Fig. 3, is an end elevation of the dasher, separate from the churn, and folded or prepared for working the butter to expel the buttermilk. Fig. 4, is a vertical transverse section of the dasher unfolded or adjusted for agitating the cream for the production of butter.

Similar letters of reference in each of the several figures, indicate corresponding parts.

The nature of my invention consists in so constructing the dasher, that it may be adjusted by the resistance of the cream in revolving through it, so as to present six centripetal cutting or agitating blades to the cream, and then, after the butter is produced, to be adjusted, so as to present but two centrifugal gathering blades, which gather the butter, work it into rolls, and expel the buttermilk therefrom, in the most perfect manner.

To enable others skilled in the art to make and use my invention, I will proceed to describe its construction and operation more minutely.

A, represents the dasher; it is composed of six blades or agitators—those lettered, *a, a,* being secured fast on the main end pieces, B, which support the other parts of the dash. These blades revolve with the end pieces, B, B, which are hung on the short journals, or axes, *d, d.* The other blades, lettered *b, b,* and *c, c,* are secured fast on the divided end pieces, C, C, in the manner shown in the drawing—said pieces being placed diagonally to the pieces, B, B, and each of their sections are hung loosely on pins, *e, e,* which are set eccentric to the axis of the dasher. The blades, *b, c,* are so hung and bear such relation to each other, as shown plainly in the drawing, that one operates upon the other or upon the end pieces, upon which it is hung, when the dasher is turned in the direction of the arrow, 2, and the cream strikes it as indicated by the arrow, 3, which end pieces, as they are operated upon, cause each blade to separate from the other, or all of them to change their position at one time, from that shown in Figs. 1, 2, and 3, and occupy the position shown in red lines in Fig. 2, and in black lines in Fig. 4. When the blades occupy this position they serve effectually for agitating and throwing the cream toward the center of the churn, until it is converted into butter. By dividing the end pieces, C, C, diagonally in the line of a cima reversa, the edges of the blades are always brought in contact with them, and cause them to open as above described, or to close together as shown in Fig. 3. The blades all close at once when the dasher is turned in the direction of the arrow, 1, and the butter strikes them as indicated by the arrow, 4. When they are thus closed, they serve effectually for gathering the butter-working it into rolls, and expelling the buttermilk therefrom. The blades are set at different angles, consequently they all strike the cream at different points as they revolve; and agitate it more thoroughly. The blades, *c, c,* have a greater curvature given them in line of a scroll, than those, *b, b,* as seen in the drawing. This increased curvature commences from the termination of the curve of the blades, *b, b,* as seen in the drawing. This increased curvature prevents the dasher throwing the butter toward the center of the churn, while gathering and working it, which cannot be effected so perfectly in any churn in use, as by this,—there being no chance for the edges of the blades, *c, c,* to take hold of the butter, and carry it round, while gathering and working it into a roll.

What I claim as my invention, and desire to secure by Letters Patent, is:—

The manner herein described of dividing the end pieces, C, C, and having them eccentric to the axes of the dasher, in combination with the arrangement of the blades, *a, b, c;* so that the dasher may be adjusted, by the resistance of the cream in revolving through it, so as to present six centripetal cutting or agitating blades to the cream; and, then after the butter is produced to be adjusted, by reversing the motion of the dasher, and through the resistance of the butter, so as to present but two centrifugal gathering blades for gathering the butter, working it into rolls, and expelling the buttermilk therefrom, substantially as described.

ROBERT W. DAVIS.

Witnesses:
WM. L. SMITH,
W. S. WRIGHT.